A. S. HUBBARD.
ELECTRICAL SYSTEM OF DISTRIBUTION.
APPLICATION FILED AUG. 7, 1909.

1,106,510.

Patented Aug. 11, 1914.

WITNESSES:
W. A. Hutton
John O. Fensler

INVENTOR
Albert S. Hubbard

BY
Kenyon & Kenyon
his ATTORNEYS

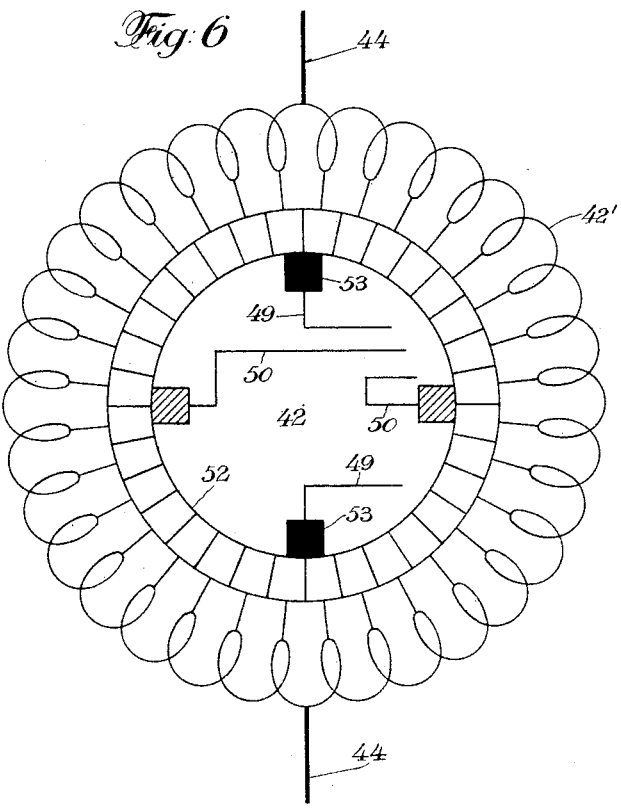

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

1,106,510.  Specification of Letters Patent.  Patented Aug. 11, 1914.

Application filed August 7, 1909. Serial No. 511,682.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates to electrical systems of distribution and to particular arrangements of apparatus which may be used in connection therewith.

My invention is more especially designed with respect to systems in which an alternating current circuit is supplied from a suitable source and a storage apparatus is arranged to be charged from said circuit and to discharge to said circuit.

One object of my invention is to provide an arrangement and parts which will more economically and efficiently regulate the operation of such systems.

Further objects, features and advantages will more clearly appear from the detail description given below taken in connection with the accompanying drawings which form a part of this specification.

Figure 1:
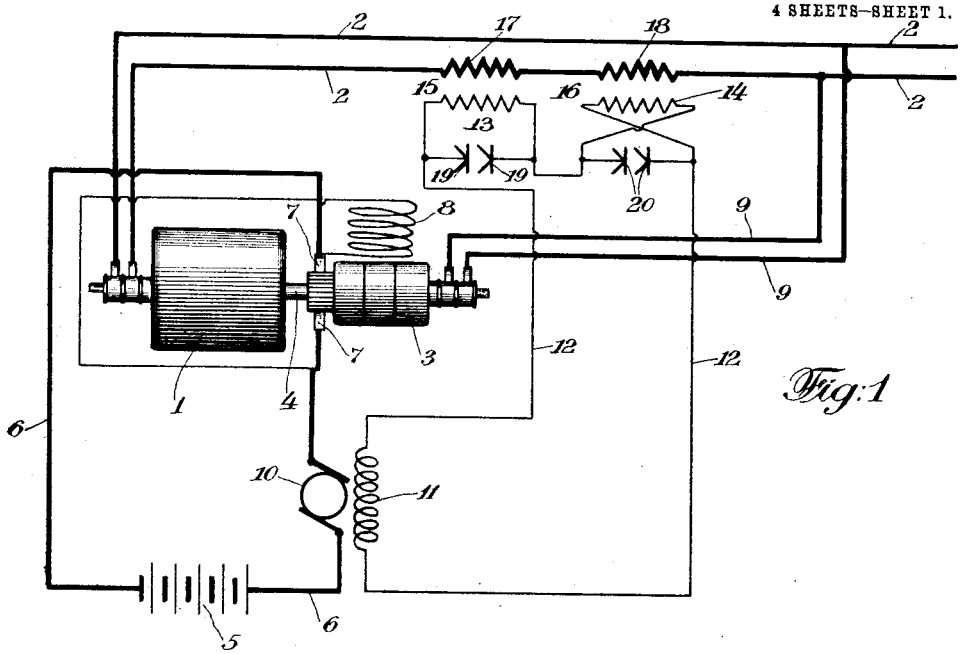
Figure 2:
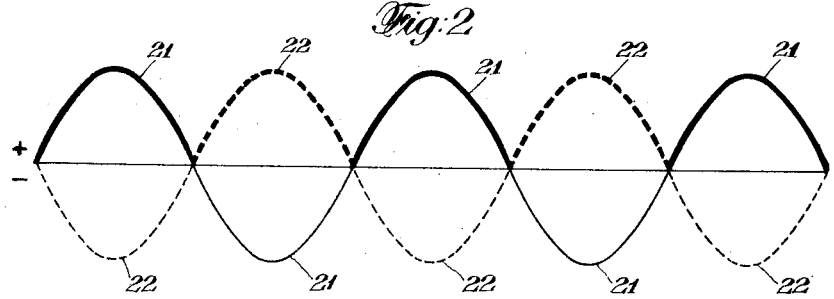
Figure 3:
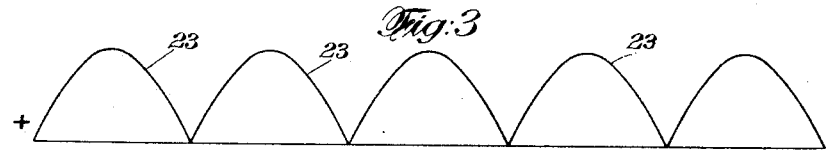
Figure 4:
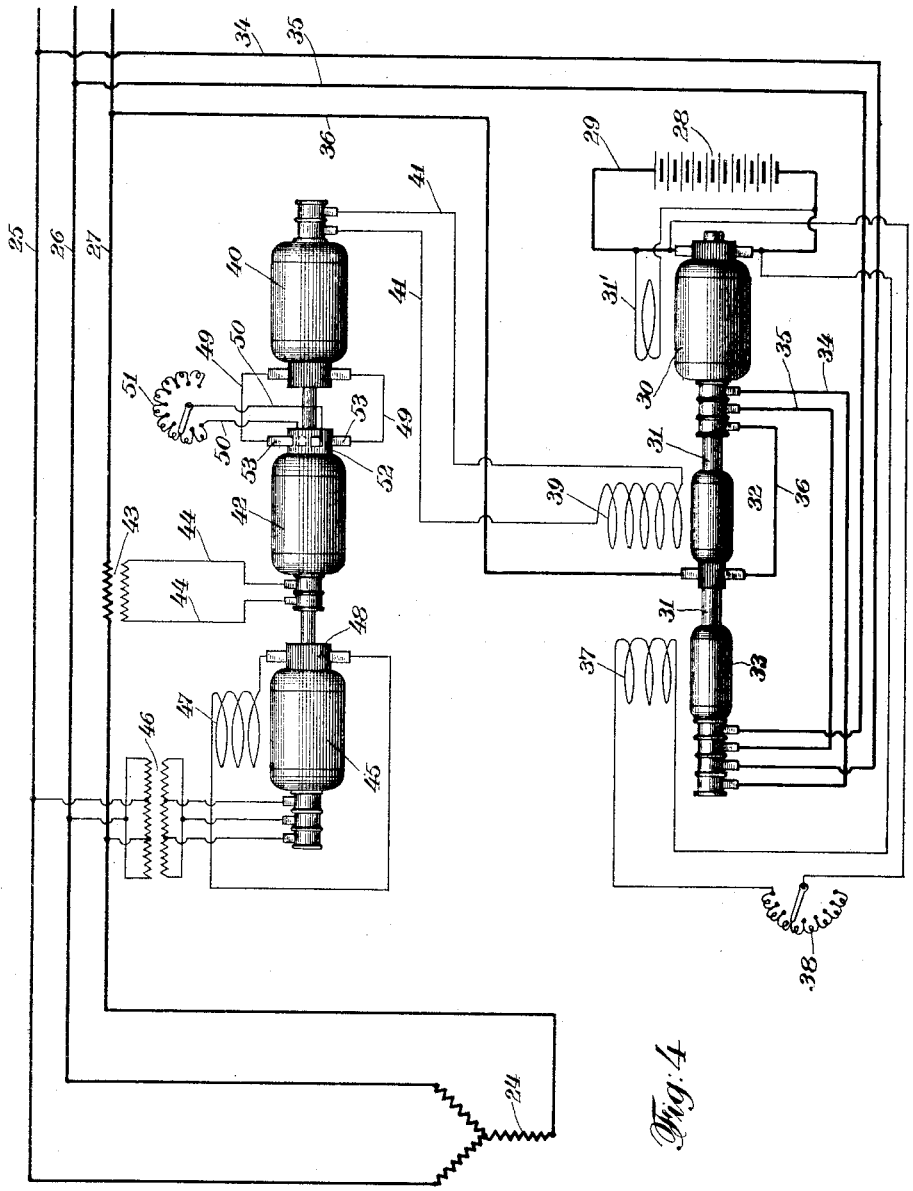
Figure 5:
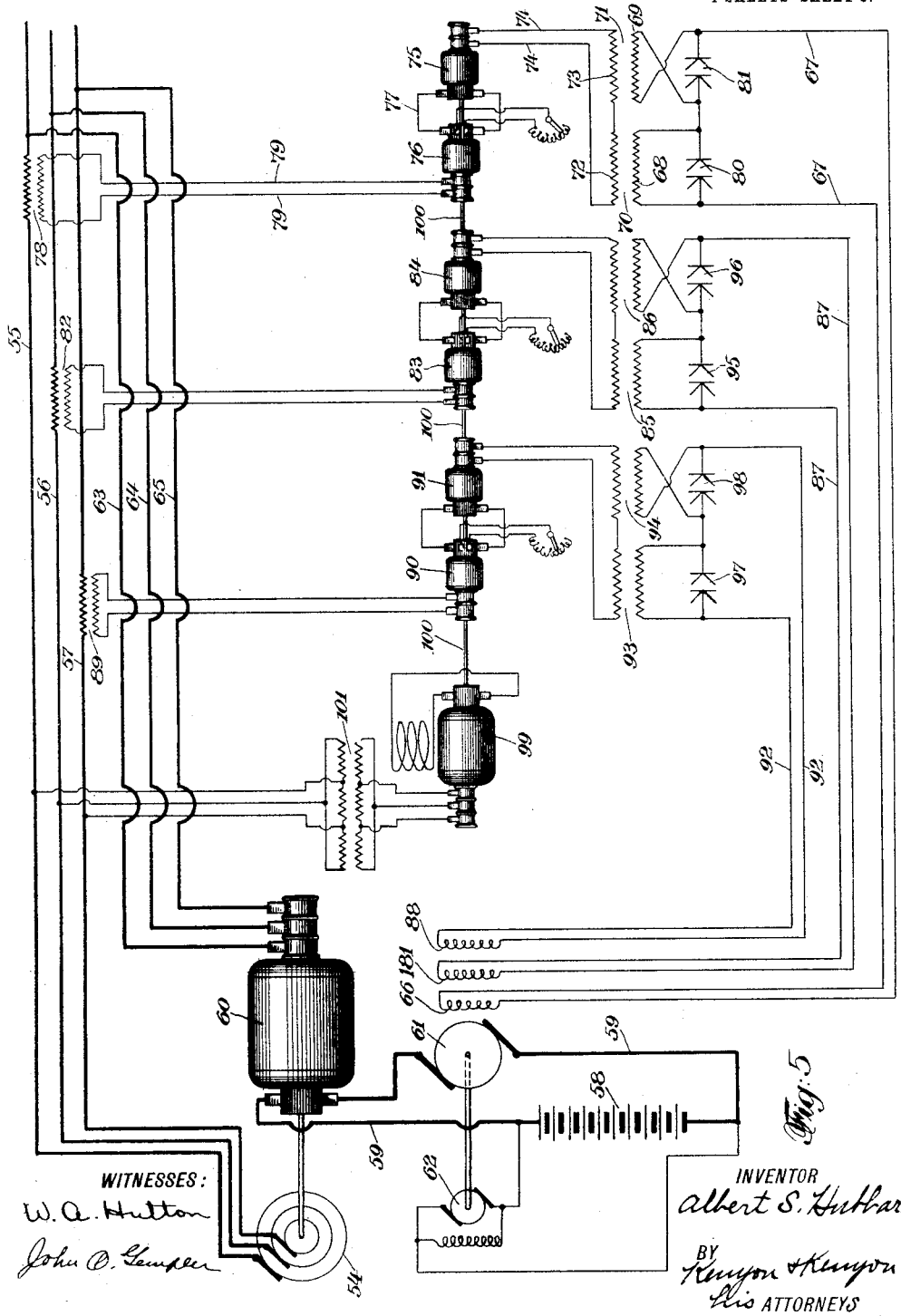

In the drawings, Figure 1 shows diagrammatically a system embodying one form of my improvements. Fig. 2 is a diagram representing the voltages applied in the auxiliary regulating circuit of Fig. 1. Fig. 3 is a diagram of curves representing the current in said circuit. Fig. 4 represents a modified system embodying one form of my invention, and Fig. 5 represents still another modified system embodying my invention. Fig. 6 is a diagram illustrating one of the regulating machines of the system.

Referring to Fig. 1, 1 represents a main alternating current generator feeding a single phase alternating current circuit 2, 2. Any suitable translating devices or load may be connected to the circuit 2, 2 in the usual manner. 3 represents a rotary converter driven by a shaft 4, connected to the main dynamo 1. 5 represents a storage battery connected in a direct current circuit 6 across the brushes 7 of the direct current end of the rotary converter 3. The converter 3 may be excited by field coils 8 connected across the brushes 7. The alternating current end of the converter 3 is connected to the circuit 2, 2, in parallel with the generator 1 by means of conductors 9. In series with the battery 5 in the circuit 6 is a booster 10 having a suitable field coil 11. Field coil 11 is connected in a circuit 12 in which are connected the secondaries 13, 14, of transformers 15 and 16 respectively, the primaries 17 and 18 thereof being connected in series in the single phase circuit 2, 2. Transformers 15 and 16 are oppositely connected so that at any instant their electromotive forces, which are produced in the circuit 12, are substantially equal and opposed to one another. 19 represents an aluminum rectifier connected across the secondary 13 of transformer 15, and 20 represents a similar rectifier connected directly across the secondary 14 of the transformer 16.

The operation of the system shown in Fig. 1 is as follows: With a normal average load on the circuit 2, 2 the strength of the field coil 11 is such that the electromotive force of the battery 5 and booster 10 taken together is just sufficient to cause the battery to float and the converter 3 will transfer energy in neither one direction nor the other. If, however, the load on the system should increase a greater current will be produced in the circuit 12, 12, by transformers 15 and 16, so that the booster 10 will receive a greater excitation in a direction to increase the electromotive force of the circuit 6, 6 at the brushes 7, 7, so that the converter 3 will transfer energy to the alternating current side thereof, whence it will be delivered to the circuit 2, 2, by conductors 9, so that the battery will take substantially the increase in load on the system. In a similar manner if the load on the system decreases the excitation of booster 10 decreases so that the electromotive force at the brushes 7 is decreased and the converter 3 will transfer energy from the circuit 2, 2, to the direct current circuit 6, 6, in a direction to charge the battery 5 in a well known manner.

The operation of the auxiliary circuit 12, 12, is as follows: The aluminum rectifier 19 being connected directly across the terminals of the secondary 13 it will thus short-circuit said secondary when the voltage produced is in one direction but will not short-circuit the same when the voltage is in the other direction. This is due to the nature of the rectifier 19, which is of that type which allows a current to pass through it in one direction but not in the other. In a similar manner the rectifier 20 will short-circuit the secondary 14 of the transformer 16 when its voltage is in one direction but will not short-circuit the same when its voltage is in the other direction. The voltages produced in these transformers may be represented by the curves shown in Fig. 2, in which the solid line curve 21 represents the voltage produced by transformer 15 and the dotted line curve 22 represents the voltage produced by transformer 16. Assuming that the upper portions of these curves are positive and the lower portions negative the rectifier 19 will short-circuit the transformer 15 at those periods of time represented by the lighter or negative portions of the curve 21, so that at those periods of time, the secondary 13 being short-circuited, the transformer 15 will produce no current in the circuit 12, 12. The transformer 16 being oppositely connected to the transformer 15 the electromotive force produced by its secondary in the circuit 12, 12 will be positive at the time that that of the transformer 15 will be negative and vice versa. In a similar manner the rectifier 20 short-circuits the secondary 14 when its electromotive force is negative but not when its electromotive force is positive, so that the transformer 16 will produce no current in the circuit 12, 12 during those periods of time represented by the light dotted lines 22. It will thus be apparent that the transformers 15 and 16 with the aluminum rectifiers 19 and 20 produce a current in the circuit 12, 12, in which the lower or negative portions are eliminated and in which only the upper or positive portions are maintained, the result being that a uni-directional pulsating current, as represented by curve 23 in Fig. 3, is produced in the circuit 12, 12. The magnitude of this current, however, varies with the magnitude of the load on the alternating current circuit 2, 2 and the pulsations of this uni-directional current have the same frequency as those of the alternating current circuit 2, 2, and are substantially in phase therewith. Because of this operation the booster 10 is excited by a pulsating current, so that it produces a pulsating electromotive force and consequently causes, when the battery is discharging, a pulsating current to be forced through the converter 3. In this manner the converter 3 produces an alternating current electromotive force at its alternating current and substantially in phase with that of the circuit 2, 2, which electromotive force is increased over what it would be if the booster 10 were not in circuit, but it will be apparent from the above that the voltage of the converter 3 is only varied or increased fluctuatingly in accordance with the frequency of the circuit 2, 2, so that the direct current circuit is caused to deliver energy to the conductors 9 and circuit 2, 2, only when power is being produced in said circuit. That is, when the current or power curve on the alternating current circuit 2, 2, passes through zero, the current in coil 11 comes back to zero, as shown in Fig. 3, and discharge of the battery comes back to zero, so that the battery discharges fluctuatingly to cause a pulsating power to be supplied to the alternating current circuit 2, 2, in accordance with the fluctuating power being discharged thereover, so that extra load upon the alternating current circuit 2, 2, is taken by the battery in a most efficient and economical manner. In this manner the battery is not supplying energy when it is not needed, and the result is to produce a compensatory storage apparatus which discharges with a pulsating effect as distinguished from a "fly wheel" effect.

Referring to Fig. 4, I there show a modified system, in which 24 represents a source of three-phase alternating current feeding the three-phase circuits 25, 26 and 27. 28 represents a storage battery connected in a direct current circuit 29 across the direct current end of a rotary converter 30. Converter 30 is excited by fields 31 shown, connected across its direct current end. Driven from the converter 30 by shaft 31 are two boosters 32 and 33. Each of the three-phases of the alternating current end of the converter 30 are connected to the three-phases 25, 26 and 27 by means of conductors 34, 35 and 36 respectively. The booster 32 is arranged in series in conductor 36 so as to effect that phase only while the booster 33 is arranged in series with the conductors 34 and 35 so as to effect those phases only. The booster 33 is excited by field windings 37 connected across the direct current end of the converter 30. A rheostat 38 is included in series therewith for purposes of regulation. The booster 32 is provided with field windings 39 connected across the alternating current end of a converter 40, by means of conductors 41. The converter 40 is preferably of that type fully shown and described in Van Wagenen Patent, No. 869,279, dated Oct. 29, 1907, so that it transmits the energy supplied to it without producing any generator action. 42 represents a rectifier which is preferably of the type fully shown and described in Hubbard Patent, No. 869,244, dated Oct. 29, 1907. The alternating current end of the rectifier 42 is connected to the secondary of a transformer 43 by means of conductors 44. The primary of the transformer 43 is connected in series in the conductor 27 of the main alternating current circuit. Both the converter 40 and rectifier 42 are driven by a synchronous motor 45 supplied from the main alternating current circuit through a transformer 46. The motor 45 may be excited by fields 47 connected across a direct current commutator 48 thereon.

The rectifier 42 is supplied with an alternating current which varies in accordance with that phase of the polyphase alternating current on the main circuit represented by conductor 27. This current after being rectified to the apparatus 42 is supplied to a direct current circuit 49 and at the same time is made responsive to power factor changes of the system. For this purpose a by-pass circuit 50 with variable resistance 51 included therein is connected across the commutator 52 of the machine 42 at points substantially 90 electrical degrees from the brushes 53 feeding the circuit 49. This operation is fully explained in the Hubbard patent above mentioned. However a more clear idea of the operation of the machine 42 will be derived from a consideration of Fig. 6. In this figure the machine 42 is shown with distributed windings 42′ supplied from the circuit 44 through suitable slip rings. The various coils 42′ are connected to the commutator 52 which is provided with the main brushes 53 for taking off the rectified current. Supposing the windings to be stationary, then when a single phase alternating current is applied to the windings 42′ a flux is produced, the north pole of which alternately shifts from one side of the windings to the other. By rotating the windings in synchronism the position of the north pole may be always on one side of the windings, but moving through an angle of 180° and increasing from 0 to a maximum, and then dropping to 0 while moving through said angle. But the position of the maximum flux will always be the same with constant power factor. Thus the position of the flux at the instant it is at its maximum will always be the same with unity power factor. Although the value and position of the flux may vary due to the alternating current, nevertheless the position of the north pole at the instant of maximum flux is substantially fixed. This will produce a unidirectional voltage at both sets of brushes 53, 53 and 50, 50, and the current taken off by these brushes will be proportional to that in the conductor 27. The current taken by the circuit 50, 50 is not large because of the resistance 51, and at any rate the total current in the machine 42 is so small that the current lost in the by-pass circuit 50, 50 may be neglected as far as energy loss is concerned. With unity power factor and a given load each circuit 49 and 50 takes a given unidirectional current which is practically a direct current because the pulsations are largely smoothed out by the inductances in the circuits. The currents taken by the circuits 49 and 50 react upon the rotating windings 42′, similar to the armature current in a direct current dynamo, but these are so small and to a certain extent offset one another so their effect to change the position of the original flux is not harmful. However, they probably do affect the position of the original flux somewhat, but a resultant is obtained which has its maximum always at a given position with unity power factor. If now the power factor change this causes the resultant maximum flux to slightly shift to assume a new position corresponding to the change in power factor, thereby causing a relative change in currents taken by the circuits 49 and 50, the circuit 49 taking less current and the circuit 50 taking more current corresponding to the wattless component in the main circuit. That is by the slight shifting of the poles when at a maximum flux due to power factor changes, the auxiliary brushes no longer remain at the points of zero difference of potential with respect to the position of the maximum flux, but an additional electromotive force is produced thereacross responsive to wattless energy changes of the system. The current supplied to the circuit 49 is again converted into alternating current by means of the rectifier 40, which is similar to the machine 42 with the exception that the auxiliary circuit 50 and its brushes are omitted, so that the field 39 of the booster 32 is supplied with alternating current which varies in accordance with variations of load on that phase of the main circuit indicated by conductor 27, which varies in accordance with power factor changes thereof and whose frequency is the same as that of the phase indicated by conductor 27. In this manner the booster 32 is thus excited with an alternating current such that it produces an alternating electromotive force in the conductor 36 which is substantially in phase with the power distributed by the conductor 27 of the main circuit.

The further operation of the system is as follows: With a normal or average load upon the system the strength of field coils 37 and 39 is such that the converter 30 transfers energy in neither one direction nor the other and the battery floats across the line. If now an increase of load takes place upon the system upon that phase thereof which is indicated by the conductor 27, an increase in current supplied to the rectifier 42 is obtained, which in turn causes an increase in current in the circuit 41. This increase in current in the circuit 41, however, is adjusted by means of the rectifier 42, so that it is made responsive to power factor changes in a well known manner by means of the bypass 50 and resistance 51 as above described. The increase in the alternating current in the circuit 41 thus varies the action of the booster 32, so that it produces an increase of electromotive force, which increase, however, is produced only at those periods during which the power current is flowing in the conductor 27. It will thus be apparent that the battery is caused to discharge only at those periods at which the power or power current is being consumed in that phase represented by conductor 27, and that at those periods or points in the alternating current in which no power is being consumed the battery will not discharge. As shown, it is assumed that the loads on the phases represented by conductors 25 and 26 are so constant that they need no regulation, and the booster 31 regulates for changes in the phase corresponding to conductor 27 independently of changes in the other phases.

It may be desirable in some systems and it will be clearly apparent that the booster 33 may be eliminated and separate boosters, such as 32, may be inserted in place thereof, such boosters having field coils connected and arranged with respect to the main circuit exactly as the field coil 39 is connected. In this way each of the phases on the main alternating current circuit will be regulated in the same manner responsive to current fluctuations on that phase and power factor changes thereof, and the battery would be caused to pump energy into these phases exactly in accordance with the waves of each, and only at those periods when power is being supplied thereto by the main generator. As shown, however, the booster 33 is not provided with the regulating fields with which the booster 32 is provided but the booster 33 is inserted largely for the purpose of inserting or producing a voltage in the conductors 34 and 35, so that these conductors will supply a voltage to the main alternating current circuit substantially equivalent to that supplied by the conductor 36 under average conditions. The converter 30 acts in a well known manner to transfer energy from the battery to the main circuits when the load thereon is above normal, and to transfer energy from the main alternating current circuit to the battery 28 to charge the same when the load thereon is below normal.

Referring to Fig. 5, I there show a source of three-phase alternating current 54 supplying the three-phase alternating current circuit 55, 56 and 57. 58 represents a storage battery connected in a direct current circuit 59 across the direct current end of a rotary converter 60 included in series with the battery 58. In the circuit 59 is a booster 61 driven by a shunt motor 62 shown connected across the battery 58. The alternating current end of the converter 60 is connected to the main alternating current circuit by means of conductors 63, 64 and 65 respectively. The booster 61 is provided with a field coil 66 which is connected in a circuit 67 in series with secondaries 68 and 69 of two transformers 70 and 71 respectively. The primaries 72 and 73 of these transformers are connected in series with a circuit 74 which is connected across the alternating current end of a converter 75. The converter 75 is similar in every respect to the converter 40 of Fig. 4 and is connected in exactly the same manner to a rectifier 76, by means of a circuit 77, the rectifier 76 being connected to a secondary of a transformer 78 in series with the conductor 55 of the main circuit by means of conductors 79. The apparatus 75, 76 and 77 acts to produce in the circuit 74 an alternating current which varies in accordance with the alternating current on the main circuit corresponding to the phase in conductor 55 and also to power factor changes thereof. The transformers 72 and 73, therefore, produce in the circuit 67 a uni-directional pulsating current exactly in the same way as an uni-directional pulsating current was produced in the circuit 12, 12, of Fig. 1. For this purpose aluminum rectifiers 80 and 81 are connected across the secondaries 68 and 69 similarly or in the same way that rectifiers 19 and 20 are connected in Fig. 1. I use the term direct current broadly, so as to include uni-directional, pulsating current. In an exactly similar manner the booster 61 is provided with a field coil 181 in which is produced a pulsating uni-directional current responsive to load changes on the direct current circuit in the phase represented by conductor 56. For this purpose a transformer 82 is connected in series in the conductor 56 and current is furnished thereby through the rectifier 83, converter 84, transformers 85 and 86 to the circuit 87. Also in a similar manner booster 61 is provided with a field coil 88 which is supplied with a uni-directional fluctuating current responsive to power factor changes and changes in magnitude of the load on the main alternating current circuit corresponding to that phase represented by conductor 57. For this purpose transformer 89 is included in series in conductor 57 and supplies the rectifier 90 which feeds the converter 91, which in turn supplies circuit 92 and field 88 through the transformers 93 and 94. In each of these cases aluminum rectifiers 95, 96, 97 and 98 are provided in the same manner as the rectifiers 80 and 81.

The various rectifiers and converters 75, 76, 83, 84, 90 and 91 are driven by a synchronous motor 99 by means of a shaft 100, the motor being supplied with alternating current from the main circuit through a transformer 101. The operation of this system is as follows. The field coil 66 is supplied with a uni-directional pulsating current from the transformers 70 and 71 in exactly the same manner as the coil 11 is supplied in Fig. 1. This current, however, is made responsive to power factor changes by the inclusion of the converter 75 and rectifier 76 which act in exactly the same manner as the converter 40 and rectifier 42 in Fig. 4. The field coils 181 and 88 are supplied in an exactly similar manner, the only difference being that they are made responsive to current and power factor changes in the other two phases of the main alternating current circuit. These field coils 66, 181 and 88, therefore, regulate the booster and, when an excess load occurs on the system, cause it to periodically pump energy into the converter and hence to the alternating current circuit, the fluctuations or pulsations of which have the same frequency as that of the alternating current circuit and are substantially in phase therewith. By this action the battery delivers energy only when it is needed and the result is a most efficient and economical arrangement and operation for such systems. It will also be apparent that by combining the converters and rectifiers shown, I have provided a very efficient means for delivering an alternating current which is responsive not only to variations in the current supplied to the machines, but also responsive to variations in power factor changes thereof. The arrangement shown in Fig. 4 is also especially efficient since by that arrangement the booster may be inserted on the alternating current side of the converter 30, and field excitation thereof is such that it causes the battery to pump energy on to any one phase of the line or vice versa in exact accordance with the frequency of that particular phase. By so arranging the booster the aluminum rectifiers shown in the other figures may be omitted. Various other advantages and features will clearly appear to those skilled in the art.

Although I have described my improvements with great detail, nevertheless I do not desire to be limited thereto except as specified hereinafter in the claims, but Having fully and clearly described my invention what I claim as new and desire to secure by Letters Patent, is:—

1. In an electrical system of distribution, an alternating current circuit, a source of electrical energy therefor, a storage battery and connections whereby it may be charged from said circuit and discharge thereto, including means for causing the battery to discharge fluctuatingly, said fluctuations having substantially the same frequency as the pulsations of the alternating current circuit, said means including a transformer supplied by current responsive to the current in said circuit and means for short-circuiting said transformer when the electromotive force is in one direction and not in the other.

2. In an electrical system of distribution, an alternating current circuit, a source of electrical energy therefor, a storage battery and connections whereby it may be charged from said circuit and discharge thereto, including means for causing the battery to discharge fluctuatingly, said fluctuations having substantially the same frequency as the pulsations of the alternating current circuit, said means including an auxiliary circuit and means for allowing current to flow in one direction in said circuit but not in the other.

3. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including an auxiliary circuit acting to regulate the action of the battery and means for causing a pulsating uni-directional current to flow in said circuit responsive to variations on the alternating current circuit.

4. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including a transformer supplied by current responsive to variations on the alternating current circuit, an auxiliary circuit connected to said transformer, and an aluminum rectifier for causing a pulsating current to be produced in said circuit by the transformer.

5. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including an auxiliary circuit, means for producing a plurality of alternating current electromotive forces in said circuit responsive to variations on the alternating current circuit, and means for causing said electromotive forces to produce current in said circuit only in one direction.

6. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including an auxiliary circuit, means for producing a plurality of alternating current electromotive forces in said circuit responsive to variations on the alternating current circuit, and means for causing said electromotive forces to produce current in said circuit only in one direction.

7. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including an auxiliary circuit, means for producing a plurality of electromotive forces in series in said auxiliary circuit, said electromotive forces having opposite phase relations, and rectifiers for short-circuiting said electromotive forces to produce a uni-directional pulsating current in the auxiliary circuit.

8. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including an auxiliary circuit, transformers oppositely connected in series in said circuit and supplied by current responsive to variations on the alternating current circuit, and a rectifier of the aluminum type connected across each transformer to short-circuit the same when its electromotive force is in one direction but not in the other.

9. In an electrical system of distribution, an alternating current circuit, a direct current circuit including a battery, a booster, converting apparatus connecting the direct and alternating current circuits, and means for controlling the booster to cause the battery to discharge fluctuatingly, said fluctuations having substantially the same frequency as the pulsations of the alternating current circuit, said means including an auxiliary circuit and means for allowing current to flow in one direction in said circuit but not in the other.

10. In an electrical system of distribution, an alternating current circuit, a direct current circuit including a battery, a booster, converting apparatus connecting the direct and alternating current circuits, and means for controlling the booster to cause the battery to discharge fluctuatingly, said fluctuations having substantially the same frequency as the pulsations of the alternating current circuit, said means including an auxiliary circuit, means for producing a plurality of alternating current electromotive forces in said circuit responsive to variations on the alternating current circuit, and means for causing said electromotive forces to produce current in said circuit only in one direction.

11. In an electrical system of distribution, an alternating current circuit, a direct current circuit including a battery, a booster, converting apparatus, connecting the direct and alternating current circuits, and means for controlling the booster to cause the battery to discharge fluctuatingly, said fluctuations having substantially the same frequency as the pulsations of the alternating current circuit, said means including an auxiliary circuit, means for producing a plurality of electromotive forces in series in said auxiliary circuit, said electromotive forces having opposite phase relations and rectifiers for short-circuiting said electromotive forces to produce a uni-directional pulsating current in the auxiliary circuit.

12. In an electrical system of distribution, an alternating current circuit, a source of electrical energy therefor, a storage battery operatively arranged to discharge to and be charged from said circuit, means controlling the action of said battery responsive to variations on the alternating current circuit and to cause it to discharge fluctuatingly, said fluctuations having substantially the same frequency as the pulsations of the alternating current circuit, and means for causing the action of the battery to be responsive to power factor changes.

13. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including an auxiliary circuit and means for allowing current to flow in one direction in said circuit but not in the other, and means for causing the current in said circuit to be responsive to power factor changes.

14. In an electrical system of distribution, an alternating current circuit, a source of electrical energy therefor, a storage battery arranged to be charged from said circuit and to discharge thereto, and means for causing the battery to discharge fluctuatingly, said fluctuations having substantially the same frequency as the pulsations of the alternating current circuit, said means including an auxiliary circuit, means for producing a plurality of electromotive forces in series in said auxiliary circuit, said electromotive forces having opposite phase relations, means for causing said electromotive forces to be responsive to power factor changes of the system, and rectifiers for short-circuiting said electromotive forces to produce a uni-directional pulsating current in the auxiliary circuit.

15. In an electrical system of distribution, a source of alternating current, an alternating current circuit supplied thereby, a storage apparatus therefor, an auxiliary circuit acting to control the action of the storage apparatus and means for producing a uni-directional pulsating electromotive force in said auxiliary circuit responsive to changes on the alternating current circuit, and responsive to power factor changes of the system.

16. In an electrical system of distribution, a source of alternating current, an alternating current circuit supplied thereby, a storage apparatus therefor, an auxiliary circuit acting to control the action of the storage apparatus, and means for producing a uni-directional pulsating current in said auxiliary circuit responsive to changes on the alternating current circuit, the pulsations having the same frequency as the pulsations of the alternating current circuit to cause the apparatus to discharge with a current in phase with the power on the alternating current circuit.

17. In an electrical system of distribution, an alternating current circuit, a source therefor, a storage battery in operative relation thereto, means for regulating the charge and discharge of the battery responsive to variations on the alternating current circuit, said means including a rectifier supplied with current responsive to current variations on the alternating current circuit, and delivering a current responsive to power factor changes, a converter for changing said last mentioned current into alternating current, a circuit receiving the alternating current from said converter, and means for converting said last mentioned alternating current into a pulsating uni-directional current.

18. In an electrical system of distribution, an alternating current circuit, a source therefor, a storage battery in operative relation thereto, means for regulating the charge and discharge of the battery responsive to variations on the alternating current circuit, said means including an auxiliary circuit for each phase and carrying a current responsive to load changes on its phase of the alternating current circuit, and means for causing the current in each auxiliary circuit to be uni-directional, having pulsations corresponding to those of its phase.

19. In an electrical system of distribution, a source of alternating current, an alternating current circuit supplied thereby, regulating apparatus therefor including a compensatory storage apparatus and a regulating winding, and means arranged to deliver an alternating current to said winding which varies responsive to load changes and to power factor changes on said alternating current circuit.

20. In an electrical system of distribution, a source of alternating current, an alternating current circuit supplied thereby, regulating apparatus therefor including a compensatory storage apparatus and a regulating winding, and apparatus arranged to deliver an alternating current to said winding responsive to variations in the energy component of load on said circuit.

21. In an electrical system of distribution, a source of alternating current, an alternating current circuit supplied thereby, regulating apparatus therefor including a regulating winding, means arranged to produce a direct current responsive to variations in the load on said circuit and responsive to power factor changes thereof, and means for converting said direct current into alternating current and delivering it to said winding.

22. In an electrical system of distribution, a source of alternating current, an alternating current circuit supplied thereby, regulating apparatus therefor including a regulating winding, a rectifier arranged to produce a direct current responsive to the energy component on said circuit, including means for by-passing the current corresponding to the wattless component, and a converter arranged to supply said winding with alternating current from said direct current.

23. The combination of a suitable source of electromotive force means supplied by alternating current and arranged to deliver a direct current which varies responsive to load and power factor changes of the alternating current, means arranged to deliver an alternating current responsive to changes in said direct current and an electrical machine excited responsive to changes in said last mentioned alternating current.

24. The combination of a suitable source of electromotive force a device supplied by alternating current and arranged to deliver a direct current which varies responsive to load and power factor changes of the alternating current, said device including means for bypassing a current which varies responsive to the wattless component of said alternating current, means arranged to deliver an alternating current responsive to changes in said direct current and an electric machine, excited responsive to changes in said last mentioned alternating current.

25. The combination of a suitable source of electromotive force a rectifier supplied by current and arranged to deliver a current responsive to power factor changes and variations in load, a converter arranged to deliver a current responsive to changes in the current delivered by said rectifier and an electric machine excited responsive to changes in said converter current.

26. The combination of a suitable source of electromotive force a rectifier supplied by single phase alternating current and arranged to deliver a direct current responsive to variations in the alternating current and to power factor changes thereof, a converter arranged to deliver an alternating current responsive to changes in said direct current and an electric machine excited responsive to changes in said converter current.

27. In an electrical system of distribution, a source of alternating current, an alternating current circuit supplied thereby, compensating apparatus therefor, including a booster arranged to produce a pulsating electromotive force responsive to power factor changes on said circuit.

28. In an electrical system of distribution, a source of alternating current, an alternating current circuit supplied thereby, a storage battery operatively arranged with said circuit and a booster therefor arranged to regulate the charge and discharge of the battery by producing a pulsating electromotive force which varies as the load on said circuit and responsive to power factor changes thereof.

29. In an electrical system of distribution, a source of alternating current, a polyphase alternating current circuit supplied thereby, and regulating apparatus therefor including a regulating machine operatively arranged with respect to one phase, and arranged to produce pulsating electromotive force which varies as the load on its respective phase of the circuit.

30. In an electrical system of distribution a source of alternating current, a polyphase alternating current circuit supplied thereby and regulating apparatus therefor including a regulating machine operatively arranged with respect to one phase, and arranged to produce a pulsating electromotive force in phase with its respective phase of the alternating current circuit and responsive to variations in the load of the phase.

31. In an electrical system of distribution a source of alternating current, a polyphase alternating current circuit supplied thereby and regulating apparatus therefor including a regulating machine operatively arranged with respect to one phase, and arranged to produce a pulsating electromotive force in phase with and having the same frequency as the pulsations of its respective phase on the polyphase circuit and responsive to load and power factor changes of that particular phase.

32. In an electrical system of distribution, a source of alternating current, a polyphase circuit supplied thereby, boosting apparatus therefor, and means for causing said apparatus to produce a pulsating electromotive force responsive to load changes on one of said phases independent of changes on the other phase or phases.

33. In an electrical system of distribution, a source of alternating current, a ployphase circuit supplied thereby, a booster therefor and means for causing the booster to produce a pulsating electromotive force responsive to load changes and power factor changes on one of said phases independent of changes on the other phase or phases.

34. In an electrical system of distribution, a source of alternating current, a polyphase circuit supplied thereby, a storage apparatus and a booster operatively arranged with respect thereto, and means for exciting the booster with a pulsating current responsive to load changes on one of said phases but independently of changes on the other phase or phases.

35. In an electrical system of distribution, a source of alternating current, a polyphase circuit supplied thereby, a storage apparatus and a booster operatively arranged with respect thereto, and means for exciting the booster with a pulsating current responsive to load changes and power factor changes on one of said phases but independently of changes on the other phase or phases.

36. In an electrical system of distribution, a source of alternating current, a polyphase circuit supplied thereby, a storage battery and appropriate converter operatively connected therewith, a booster therefor arranged to produce a pulsating current substantially in phase with the load on one of the phases of the polyphase circuit, and means for exciting said booster with a pulsating current substantially in phase with the load on one of the phases of said circuit.

37. In an electrical system of distribution, a source of alternating current, a polyphase circuit supplied thereby, a storage battery and appropriate converter operatively connected therewith, a booster therefor arranged to produce a pulsating current substantially in phase with the load on one of the phases of the polyphase circuit, and means for exciting said booster with a pulsating current substantially in phase with the load on one of the phases of said circuit and varying responsive to load and power factor changes of that phase.

38. In an electrical system of distribution, a source of alternating current, a polyphase circuit supplied thereby, boosting apparatus therefor, a plurality of field coils for the boosting apparatus corresponding to various phases of the polyphase circuit, and means for independently exciting each of said field coils responsive to variations in the load on its particular phase.

39. In an electrical system of distribution, a source of alternating current, a polyphase circuit supplied thereby, a storage battery and appropriate converter operatively connected therewith, boosting apparatus therefor, a plurality of field coils for the boosting apparatus corresponding to various phases of the polyphase circuit, and means for independently exciting each of said field coils responsive to variations in the load and power factor changes on its particular phase.

40. In an electrical system of distribution, a source of alternating current, a polyphase circuit supplied thereby, a storage battery and appropriate converter operatively connected therewith, a booster therefor, a plurality of field coils for the booster corresponding to various phases of the polyphase circuit, and means for independently exciting each of said field coils with a pulsating current responsive to load and power factor changes on its particular phase of the polyphase circuit.

41. In an electrical system of distribution, a source of polyphase current, a polyphase distribution circuit supplied thereby, a storage apparatus, and means for causing the storage apparatus to be charged from and to discharge to one of the phases of said circuit and independent of the other phases responsive to changes in the electrical condition of that phase.

In testimony whereof, I have signed my name to this specification, in the presence of two subscribing witnesses.

ALBERT S. HUBBARD.

Witnesses:
GORHAM CROSBY,
EDWIN SEGER.

Copies of this patent may be obtained for five cents each, by addressing the "Commissioner of Patents, Washington, D. C."